US011521759B2

(12) United States Patent
Sidorov et al.

(10) Patent No.: US 11,521,759 B2
(45) Date of Patent: Dec. 6, 2022

(54) MELT CONFINEMENT DEVICE

(71) Applicant: JOINT-STOCK COMPANY "ATOMENERGOPROEKT", Moscow (RU)

(72) Inventors: Aleksandr Stalevich Sidorov, Moscow (RU); Tatyana Yaropolkovna Dzbanovskaya, Moscow (RU); Nadezhda Vasilievna Sidorova, Moscow (RU)

(73) Assignee: JOINT-STOCK COMPANY "ATOMENERGOPROEKT", Moscow (RU)

( * ) Notice: Subject to any disclaimer, the term of this patent is extended or adjusted under 35 U.S.C. 154(b) by 0 days.

(21) Appl. No.: 17/257,276

(22) PCT Filed: Dec. 25, 2019

(86) PCT No.: PCT/RU2019/001015
§ 371 (c)(1),
(2) Date: Dec. 30, 2020

(87) PCT Pub. No.: WO2020/139160
PCT Pub. Date: Jul. 2, 2020

(65) Prior Publication Data
US 2021/0272710 A1 Sep. 2, 2021

(30) Foreign Application Priority Data
Dec. 26, 2018 (RU) .......................... RU2018146642

(51) Int. Cl.
*G21C 9/016* (2006.01)
*G21C 13/10* (2006.01)
*G21C 15/18* (2006.01)

(52) U.S. Cl.
CPC ............. *G21C 9/016* (2013.01); *G21C 13/10* (2013.01); *G21C 15/18* (2013.01)

(58) Field of Classification Search
CPC ........ G21C 9/016; G21C 13/10; G21C 15/18; Y02E 30/30
(Continued)

(56) References Cited

U.S. PATENT DOCUMENTS 4,036,688 A * 7/1977 Golden ................. G21C 9/016
376/280
4,045,284 A * 8/1977 Rosewell ............... G21C 9/016
376/280

(Continued)

*Primary Examiner* — Darlene M Ritchie
(74) *Attorney, Agent, or Firm* — J. Miguel Hernandez; James R Gourley; Carstens, Allen & Gourley, LLP

(57) ABSTRACT

This invention involves systems which provide for the safety of nuclear power plants that can be used in the event of serious accidents leading to the destruction of the housing and sealed containment structure of a reactor. In one aspect, the system can increase nuclear power plant safety by preventing the escape of liquid and solid radioactive materials (corium) from a melt confinement device in the event of a serious accident involving the escape of core melt from a nuclear reactor. The invention addresses the problem of increasing the efficiency and reliability of a melt confinement device by improving the conditions for cooling corium. The problem is solved by the use of a filler formed in upper cassettes and in a lower cassette. Said cassettes are configured with vertical and horizontal channels which provide for the uniform distribution of melt in the housing undergoing cooling.

4 Claims, 5 Drawing Sheets

(58) Field of Classification Search
USPC .......................................................... 376/280
See application file for complete search history.

(56) References Cited

U.S. PATENT DOCUMENTS

| | | | | | |
|---|---|---|---|---|---|
| 4,280,872 | A | * | 7/1981 | Ferrari | G21C 9/016 376/280 |
| 5,343,506 | A | * | 8/1994 | Artnik | B01F 5/061 376/280 |
| 5,659,589 | A | * | 8/1997 | Wistuba | G21C 9/016 376/280 |
| 6,347,129 | B1 | * | 2/2002 | Kolev | G21C 9/016 376/280 |
| 2009/0080589 | A1 | * | 3/2009 | Sato | G21C 9/016 376/280 |
| 2011/0150165 | A1 | * | 6/2011 | Theofanous | G21C 9/016 376/289 |
| 2015/0357057 | A1 | * | 12/2015 | Edwards | G21C 9/00 376/298 |

* cited by examiner

MELT CONFINEMENT DEVICE

CROSS-REFERENCE TO RELATED DISCLOSURE

This application is a U.S. National Stage of International Application No. PCT/RU2019/001015, filed on Dec. 25, 2019, and published as WO 2020/139160 on Jul. 2, 2020, titled "Melt Confinement Device," which claims priority to RU 2018146642 filed on Dec. 26, 2018. Each application, publication, and patent listed in this paragraph are hereby incorporated by reference in their entireties.

BACKGROUND OF THE INVENTION

The invention relates to the field of nuclear energy, in particular, to systems that ensure the safety of nuclear power plants (NPPs), and can be used in severe accidents leading to the destruction of the reactor vessel and its hermetic shell.

The greatest radiation hazard is accidents with core melting, which can occur during multiple failure of core cooling systems.

In such accidents, the core melt, corium, melting the internal reactor structures and the reactor vessel, flows beyond it and, due to the residual heat remaining in it, can violate the integrity of the sealed shell of the nuclear power plant—the last barrier to the release of radioactive products into the environment.

To avoid this, it is necessary to localize the core melt that has leaked from the reactor vessel (corium) and to ensure its continuous cooling, up to complete crystallization. This function is performed by the system for localization and cooling of the reactor core melt, which prevents damage to the hermetic shell of nuclear power plants and thereby protects the population and the environment from radiation exposure during severe accidents of nuclear reactors.

DESCRIPTION OF RELATED ART

A device [1] for localization and cooling of the corium of an emergency water-type nuclear reactor containing a cooled trap located in the sub reactor space, a protective truss located under the bottom of the reactor, and a console located above the shaft above the trap are placed in the trap sacrificial materials-diluents of uranium-containing the oxide and steel constituents of the corium melt are formed into cassettes, which are compiled into blocks.

The disadvantage of this device is the insufficiently effective cooling of the melt associated with a divided (cellular) installation of ceramic elements, in which, when the corium of the steel frame is destroyed by the melt, the ceramic elements, as lighter, float in the corium melt and practically do not interact with its oxide component passing into slag, which can lead to the release of liquid and solid radioactive materials (corium) outside the melt localization device.

A device [2] for localization and cooling of the corium of a nuclear reactor is known, located in the subreactor space of a concrete mine, including a vessel cooled by water in the form of a vessel, the bottom of which is recessed to the center with a slope of 10-20 degrees, and the bottom thickness is not less than 30% more than the thickness the side wall of the case, while in the case there are briquettes of the diluent material of the uranium oxide corium bound by cement mortar and placed in steel blocks placed in several horizontal layers, the bottom of the lower block is identical in shape to the bottom of the case, the blocks above it have a central hole, and the attachment points of the blocks to the body and between each other are placed in vertical slots of the blocks, and the slots and, partially, the blocks are filled with concrete.

The disadvantage of this device is the insufficiently effective cooling of the melt associated with a divided (cellular) installation of ceramic elements, in which, when the corium of the steel frame is destroyed by the melt, the ceramic elements, as lighter, float in the corium melt and practically do not interact with its oxide component passing into slag, which can lead to the release of liquid and solid radioactive materials (corium) outside the melt localization device.

Closest to the claimed invention is a device [3] for the localization of the melt, comprising a cooled case with a double wall, filled with filler arranged in blocks, each of which is divided into segments by attachment points mounted radially relative to the vertical axis of the device, while filling the segments with filler the formation of free zones in communication with the Central through hole for the passage of the melt.

The disadvantage of this device is the insufficiently effective cooling of the melt associated with a divided (cellular) installation of ceramic elements, in which, when the corium of the steel frame is destroyed by the melt, the ceramic elements, as lighter, float in the corium melt and practically do not interact with its oxide component passing into slag, which can lead to the release of liquid and solid radioactive materials (corium) outside the melt localization device.

BRIEF SUMMARY OF THE INVENTION

The technical result of the claimed invention is to increase the safety of a nuclear power plant by eliminating the release of liquid and solid radioactive materials (corium) beyond the melt localization device in the event of a severe accident with the core melt leaving the nuclear reactor.

The problem to which the invention is directed, is to increase the efficiency and reliability of the melt localization device by improving the conditions for cooling the corium.

The problem is solved due to the fact that in the device for localizing the melt, including a cooled case with a double wall, the bottom of which is recessed to the center with a slope, filled with filler, a guide element for organizing the movement of the melt, a passive system for supplying water to the surface of the melt, according to the invention, the filler consists of several upper and lower cassettes, in each of which one central and several peripheral vertical storage channels are made, the diameter of the central vertical storage channel exceeds the equal diameters of the vertical peripheral storage channels, horizontal radial distribution channels connecting the vertical peripheral channels drives with a central vertical storage channel, while the horizontal radial distribution channels of the lower cassette are made with a slope, the angle of which coincides with the slope of the bottom of the melt trap body, horizontal azimuthal distribution channels connecting vertical peripheral storage channels of the upper cassettes with each other, while the horizontal radial and azimuth distribution channels have equal diameters, while the upper and lower cassettes contain ceramic plates made with microchannels separated by horizontal and vertical slot channels, and are installed each other in such a way that the contours of their vertical central and peripheral storage channels coincide with each other.

Additionally, in the melt localization device, each peripheral vertical storage channel is located on the same axial axis with the corresponding radial rib of the cooled case.

Additionally, the depth of the central vertical channel exceeds the depth of the peripheral vertical storage channels.

In addition, a damper is installed in the central vertical storage channel, consisting of a central shell, power ribs connected to the central shell, inclined plates located between the power ribs, and clamps that secure the damper to the cooled case.

One distinctive feature of the claimed invention is that the filler consists of several upper and lower cassettes, each of which has one central and several peripheral vertical storage channels, the diameter of the central vertical channel exceeds the equal diameters of the vertical peripheral storage channels, horizontal radial channels distributors connecting the vertical peripheral storage channels to the central vertical storage channel, while the horizontal radial distribution channels of the lower cassette are made with a slope, the angle of which coincides with the slope of the bottom of the melt trap body, horizontal azimuthal distribution channels connecting the vertical peripheral storage channels the upper cassettes with each other, while the horizontal radial and azimuthal channels have equal diameters, ceramic plates in the upper and lower cassettes, made with microchannels and separated by horizontal and vertical slotted channels, while all the cassettes are mounted on top of each other so that the contours of their vertical central and peripheral storage channels coincide with each other.

Another distinctive feature of the claimed invention is that each peripheral vertical storage channel is located on the same axial axis with the corresponding radial rib of the cooled case.

Another distinguishing feature of the claimed invention is that the depth of the central vertical storage channel exceeds the depth of the peripheral vertical storage channels.

Another distinctive feature of the claimed invention is that a damper is installed in the central vertical storage channel, consisting of a central shell, power ribs connected to the central shell, inclined plates located between the power ribs, and clamps for attaching the damper to the cooled case.

Such a filler structure provides an effective distribution of the core melt within the cooled body due to the following elements:

the central and peripheral vertical storage channels provide simultaneous reception of large masses of the core melt, as well as the distribution of the melt over the volume of the entire filler during overflow of individual storage channels, which usually occurs during non-axisymmetric outflow of the core melt from the reactor vessel;

the central and peripheral vertical storage channels provide protection of the upstream structures from thermal radiation from the side of superheated steel at the initial stage of receipt of the core melt from the reactor vessel into the filler, since they do not allow the upper part of the trap body to be heated by direct thermal radiation (practically block the direct lumbar), and ensure that heat is retained in the liquid steel entering the filler during the two-stage process of the expiration of the core melt from the reactor vessel, in which, at the initial stage of the destruction of the reactor vessel, mainly superheated steel with a small amount of liquid oxides flows from it, then from 30 minutes to 3-4 hours, the main volume of liquid oxides containing a certain amount of liquid case steel flows from the reactor vessel;

the central and peripheral vertical storage channels provide effective conditions for ensuring the efficiency of the slotted channels in full, since the vertical arrangement of the storage channels provides mainly a vertical interface at the contact of the core melt with ceramic elements, and the resulting water vapor is evacuated through the slotted channels, weakly interacting with the core melt;

horizontal radial and azimuthal distribution channels provide a link between the central and peripheral vertical storage channels, and, therefore, the azimuthal redistribution of the melt between them, which makes it possible to efficiently equalize the melt level between the vertical storage channels with non-axisymmetric flow of the core melt from the reactor vessel, preventing overflow of the melt over their edges. Additionally, these horizontal distribution channels make it possible to avoid overfilling of individual vertical storage channels, to ensure that the mass of the incoming melt is aligned with the volume of the filler, thereby balancing the thermomechanical load on the filler, and, ultimately, ensure uniform heating of the melt trap body around the entire perimeter and height.

horizontal radial and azimuthal distribution channels, providing a uniform melt level in the filler, make it possible to fully use the advantages of such a structure, namely, the low melt level in the storage channels allows the filler to be used as passive protection from the effects of thermal radiation on the structural elements of the melt trap, truss-console and guide plate in the early stages of the expiration of the core melt from the reactor vessel. For example, in the two-stage process of melt inflow, the liquid metal melt, flowing out of the reactor vessel in a salvo mode, is completely located in the lower part of the filler, not being able to form a single open radiating surface;

slotted channels separating the ceramic elements of the filler, initially filled with a binder, ensuring the integrity of the filler cassette. In the process of heating the contact zone of the melt and the filler, the process of physicochemical interaction begins at the contact border, and the binder begins to degrade as the temperature rises, losing water. The vapor released from the collapsing binder moves mainly along the vertical slotted peripheral channels, bypassing the zones blocked by the melt. Only in those places where the melt fills the slotted channels from above, steam passes through the thickness of the melt, entering into chemical interaction with it. Thus, the more branched the structure of the slotted channels, the easier it is for a couple to bypass the melt without interacting with it;

microchannels located inside the ceramic elements formed during sintering provide the specified kinetics of interaction with the core melt.

DETAILED DESCRIPTION OF THE INVENTION

The claimed invention works as follows. The claimed device for localizing the melt (hereinafter—ULR) is a crucible type device located in the subreactor space of a concrete mine.

Figure 1:
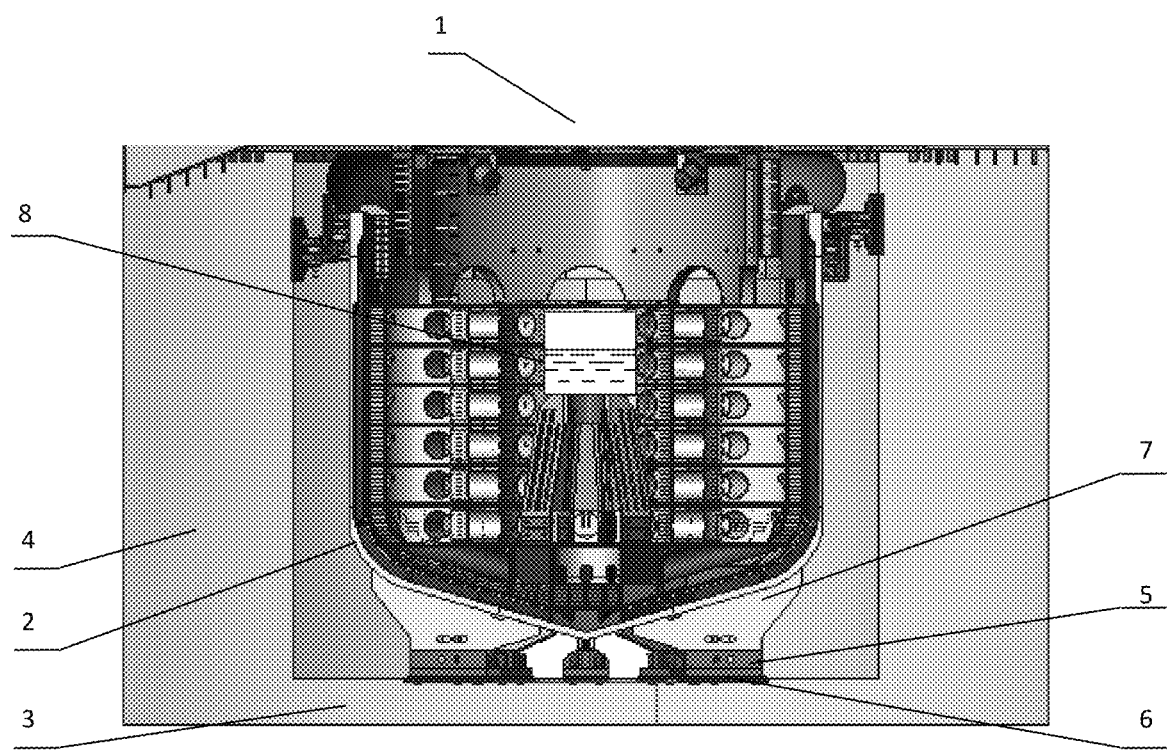
FIG. 1 illustrates a diagram of a system configured to monitor the condition of nuclear reactor internals, in accordance with at least one non-limiting aspect of the present disclosure.

As shown in FIG. 1, the melt localization device (1) comprises a cooled case (2), which is a steel multilayer vessel mounted on a support fixed to a concrete slab (3) of the shaft (4).

The ULR support (1), in turn, is made in the form of several radial bearings (5) connected to the embedded plate (6) installed in the concrete slab (3) of the shaft (4) by means of various fastening devices (for example, studs, bolts pins). On the radial ribs (5), the response ribs (7) of the body (2) of the HRM (1) are installed, while the vertical planes passing along the axis of symmetry of each rib (5) of the support and the response ribs (7) of the body (2) of the HRM (1) are symmetry planes of the peripheral vertical storage channels.

The housing (2) is designed to receive and place corium melt (8) in its volume, as well as to prevent it from going beyond the established boundaries of the localization zone.

Corium consists of two main components: oxide (the main components of which are a mixture of oxides of uranium, zirconium, iron with a small amount of metals) and metal (the main components of which are a mixture of iron, zirconium with a certain amount of oxides of uranium, zirconium, iron).

The housing (2) is filled with a filler, namely, a sacrificial material made of a steel composition and relatively light and fusible oxides, which, in accordance with the claimed invention, are made in the form of elements arranged in cassettes mounted on top of each other along the vertical axis of the housing (2). In the event of a severe beyond design basis accident, the filler ensures subcriticality of the corium within the established boundaries of the localization zone for any configuration of oxide corium and any water-uranium ratio with pure unborated water.

To ensure subcriticality of the corium, the filler incorporates absorbing materials that co-crystallize with uranium and plutonium oxides.

To change the properties of the corium in the HRM, sacrificial ceramic materials based on iron oxide $BeO_3$ (hematite) and aluminum oxide $Al_2O_3$ can be used.

Hematite actively interacts with the oxide part of corium and molten zirconium from its metal component, but slowly with molten iron and chromium metal component of corium.

Figure 2:
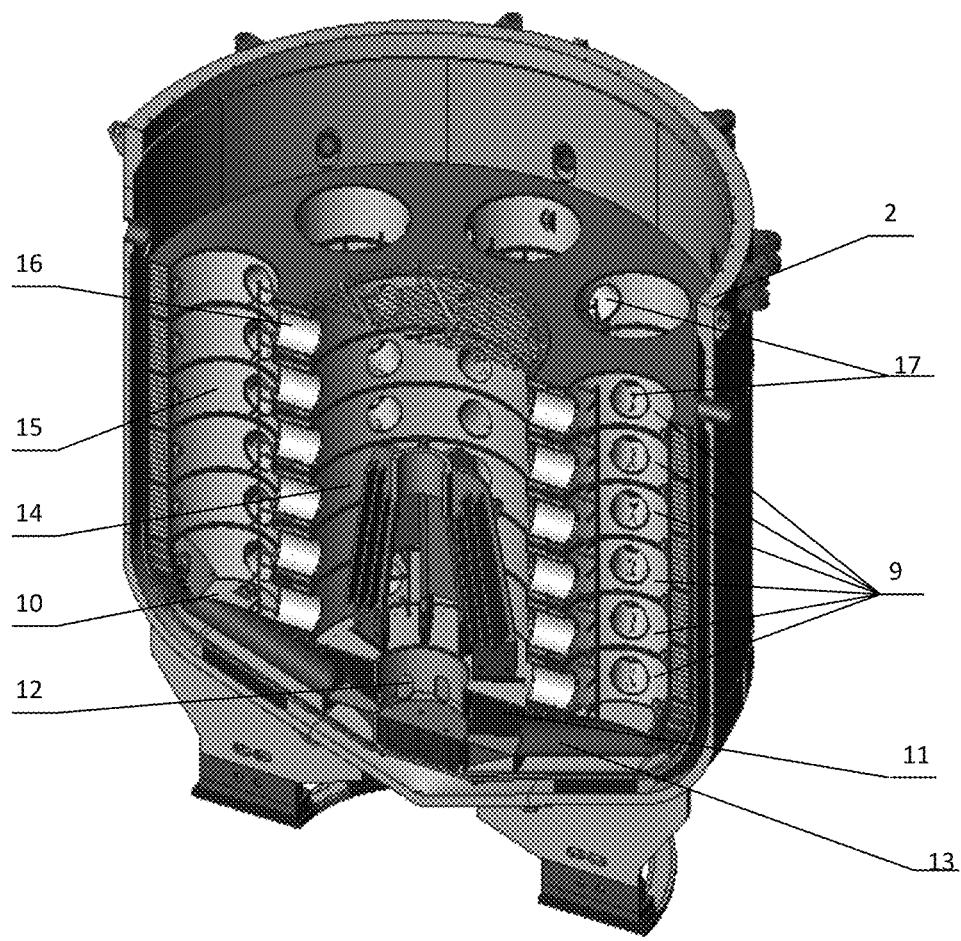
FIG. 2 illustrates a block diagram depicting the systematic functions of the system of FIG. 1, in accordance with at least one non-limiting aspect of the present disclosure.

As shown in FIG. 2, the filler cassettes are divided into two groups according to the shape of the peripheral storage channels: upper cassettes (9), characterized by profiling along the body height from each other (for example, cylindrical and torus cassettes), and the lower cassette (10).

The housing (2) is made with internal radial bearings (11), on which the lower filler cassette (10) is mounted.

The lower cassette (10) has a vertical central storage channel (12) and several peripheral storage channels (13).

The peripheral storage channels (13) are made with a slope, the angle of which coincides with the angle of inclination of the bottom of the body (2) of the melt trap.

The upper cassettes (9) are installed on the lower cassette (10). Each upper filler cassette (9) has a vertical central storage channel (14) and several vertical peripheral storage channels (15). The vertical central and peripheral storage channels (14, 15) are interconnected by horizontal radial distribution channels (16). In addition, the upper cassettes (9) have horizontal azimuth distribution channels (17) connecting the vertical peripheral storage channels (15) with the vertical central storage channel (14).

The diameter of the vertical central storage channel (14) exceeds the diameter of the vertical peripheral storage channels (15).

The vertical central storage channels (14) and the peripheral storage channels (15) for each of the upper cassettes (9) have the same dimensions, respectively. The horizontal radial and azimuth distribution channels (16, 17) of the upper cassettes (9) also have the same dimensions.

Figure 3:
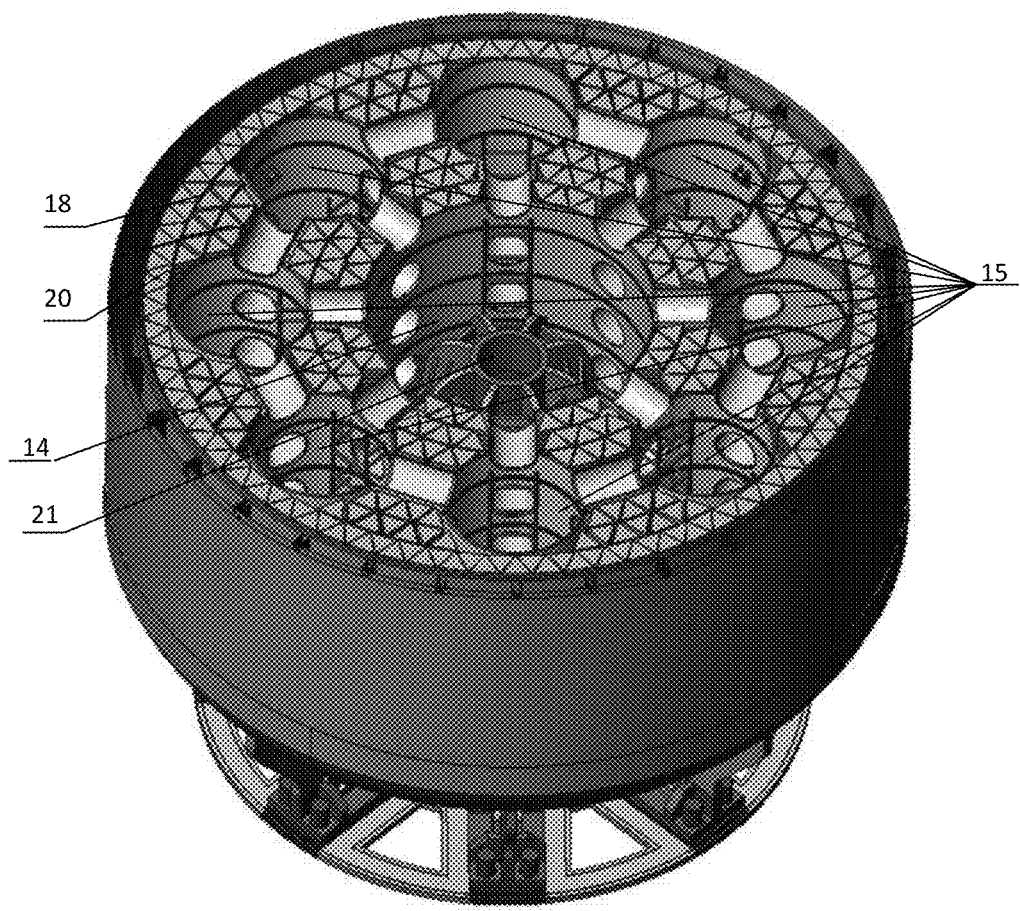
FIG. 3 illustrates a method of continually monitoring the condition of nuclear reactor internals in accordance with at least one non-limiting aspect of the present disclosure.
Figure 5:
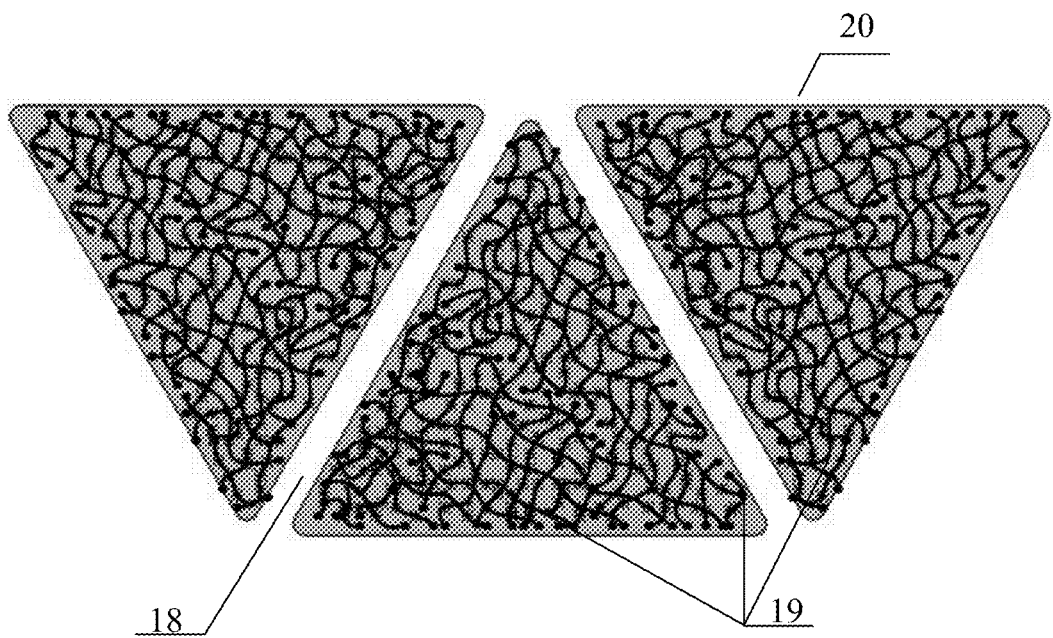
FIG. 5 illustrates a sectioned top view of an example of a core of a nuclear reactor configured for use in the system of FIG. 1, in accordance with at least one non-limiting aspect of the present disclosure.

FIGS. 3 and 5 show a filler in which slotted channels (18) and microchannels (19) are made. The slotted channels (18) separating the ceramic elements (20) of the filler are initially filled with a binder to ensure the monolithicity of the filler cassettes. In the process of heating the contact zone of the melt and the filler, the process of physicochemical interaction begins at the contact border, and the binder begins to degrade as the temperature rises, losing water. The vapor released from the collapsing binder moves mainly along the vertical slotted peripheral channels (18), bypassing the zones blocked by the melt (8). Only in those places where the melt (8) fills the slotted channels (18) from above, does the steam pass through the thickness of the melt (8), entering into chemical interaction with it. Thus, the more branched the structure of the slotted channels (18), the easier it is for the steam to bypass the melt (8) without interacting with it. Microchannels (19) located inside the ceramic elements (20) formed during sintering provide the specified kinetics of interaction with the core melt (8), that is, they determine the rate of interaction of the melt (8) with hematite and aluminum oxide at the boundary of the ceramic element (20), on which, ultimately, the energy balance of the corium melt bath, the oxidation rate of zirconium, and the release of unreacted oxygen to the corium melt bath depend.

The cassettes (9, 10) are mounted on top of one another in such a way that, in fact, they form a monolithic structure in which the storage channels (14, 15) of each cassette (9, 10), after compiling the cassettes (9, 10) on top of each other, form a kind of "wells" into which the melt (8) of the active zone enters after entering the HRM (1).

A damper (21) is installed inside the central vertical storage channel (14), designed to distribute the melt flows (8) in different radial directions.

Figure 4:
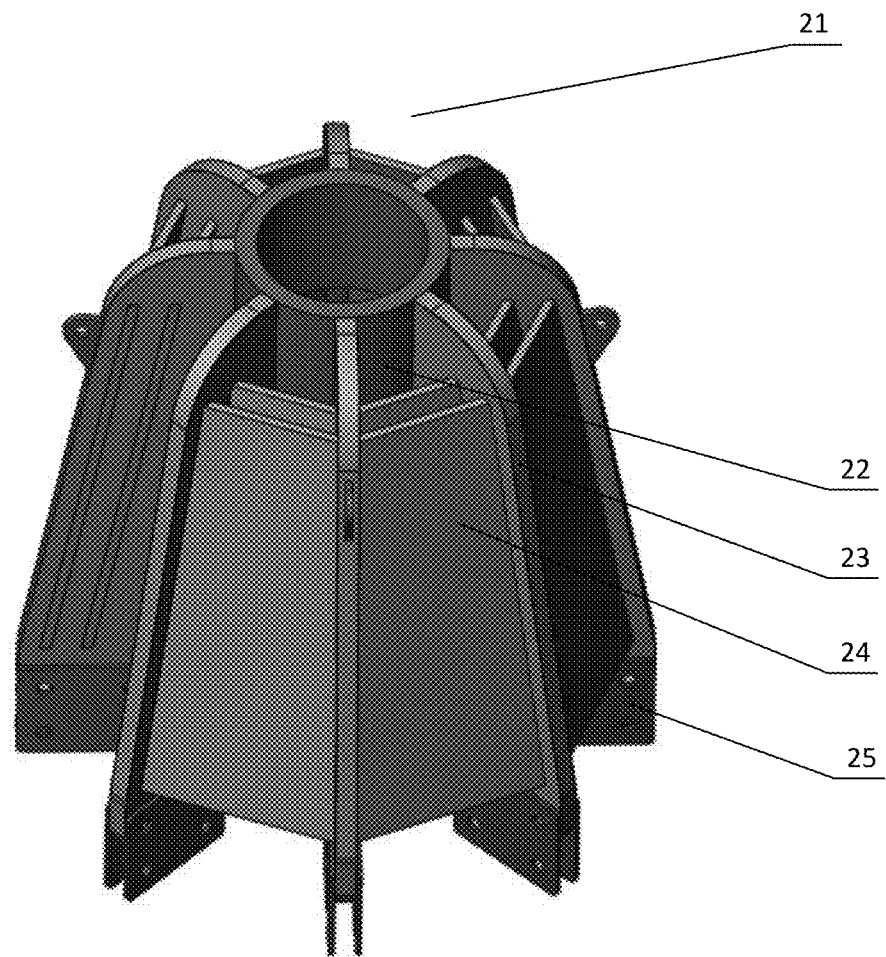
FIG. 4 illustrates a sectioned side view of an example of a core of the nuclear reactor configured for use in the system of FIG. 1, in accordance with at least one non-limiting aspect of the present disclosure.

The damper (21) shown in FIG. 4 consists of a central shell (22), power ribs (23) connected to the central shell (22), inclined plates (24) located between the power ribs (23), latches (25) securing the damper (21) to the ULR housing (1).

Inclined plates (24) of the damper (21) located between the power ribs (23) are installed from 1 to 5 pieces, parallel to each other in each segment between the power ribs (23). The number of inclined plates (24) of more than 5 does not give an additional redistributing effect due to the fact that the thickness of the inclined plates (24) should be reduced to provide the necessary angle of inclination of the plates (24), which ensures the deviation of the overheated jets of the core melt towards the filler.

The number of radial bearings (11) inside the housing (2) of the HRM (1) is set in the range from 3 to 10 pieces. The number of radial bearings (11) of less than 3 does not provide effective work on the absorption of the kinetic energy of the impact, since in this case the impact zone is not redistributed along the bottom of the body (2), but is concentrated in its local areas, which can lead to its destruction. The number of radial supports (11) of more than 10 does not increase the redistributive effect, requires a decrease in the thickness of the power ribs (23), which negatively affects their ability to absorb and redistribute the kinetic energy of the impact from falling debris of the bottom of the reactor vessel and absorb the energy of the melt jets of the active zone at the expiration melt from the reactor vessel.

In the process of bursting of the melt (8) from the reactor vessel into the filler with the damper (21) installed, hydromechanical redistribution of the melt (8) between the cassettes (9, 10) and their parts is ensured, as well as protection against direct exposure to overheated melt jets of the core on the base of the lower cassette (10) and the conical part of the body (2) of the HRM (1). Destroying and melting during the flow of the core melt from the reactor vessel, the damper (21) redistributes the kinetic energy of the melt between the upper and lower cassettes (9, 10). Energy redistribution occurs during the first volley entry of a large volume of the melt (8), which contains mainly liquid superheated steel, due to the hydromechanical deflection of the molten metal by the damper planes (21) towards the horizontal radial distribution channels (16), which, in turn, provide redistribution of the melt (8) between the vertical storage channels (14, 15).

The orientation and angle of inclination of the plates (24) of the damper (21) are selected so that the melt jets deviate from the central to the end surfaces of the upper cassettes through which the horizontal radial and azimuth distribution channels (16, 17) pass.

With a salvo inflow of, for example, 60 tons of superheated steel during 30 s, the survivability of the damper (21) is of the order of 10 s, but this time is enough to limit the first impact of molten superheated steel into the lower cassette (10) until a safe melt level forms above it and redirect part of the kinetic energy of the melt to the upper cassettes (9), flowing out of which the melt increases its level above the lower cassette (10), protecting it from the subsequent direct influence of the kinetic energy of the melt jets and flying objects.

In the process of volley inflow of superheated steel during axisymmetric or non-axisymmetric incidence of the melt jets, the filler partially fills and enters not only the central vertical storage channel (14), but also the peripheral vertical storage channels (15) of the upper cassettes (10). In this case, the damper (21) acts as a hydrodynamic damper, providing a directed collision of the melt jets horizontally flowing from the peripheral vertical storage channels (15) into the vertical central storage channel (14) through the horizontal radial distribution channels (16), with vertical melt jets moving in the vertical central storage channel (14) and deflected by inclined plates (24) of the damper (21) in the radial direction towards the horizontal radial distribution channels (16).

The lower cassette (10) plays a special role in the process of volley melt inflow: together with the damper (21) it protects the bottom of the body (2) of the HRM (1), moreover, the damper (21) does this at the very initial moment of the melt arrival, and the lower cassette (10) performs this function after the destruction of the damper (21), due to the special shape of the location of the peripheral vertical storage channels (13). The central and peripheral vertical storage channels (12, 13) of the lower cassette (10) are made in such a way that the corium melt entering the peripheral vertical storage channels (13) of the lower cassette (10) from the cassettes located above (9) flows down inclined peripheral storage channels (13) of the lower cassette (10) into its central vertical storage channel (12), forming a melt level over the ceramic elements (20) of the lower cassette (10) located at its base. The thickness of the installed ceramic elements (20) located in the base and on the lateral conical surface of the lower cassette (10) is selected in such a way as to provide preheating of the conical bottom of the housing (2) of the ULR (1), which has a greater thickness than its cylindrical part, to equalize the temperature fields of the casing (2) ULR (1) by the time the oxide (energy-releasing) part of the corium melt enters the filler. Inclined peripheral vertical storage channels (13) of the lower cassette (10) provide uniform heating of the conical part of the bottom of the housing (2) ULR (1), and the base of the housing (2) ULR (1) is heated from the side of the base of the central vertical storage channel (12) of the lower cassette (10), for which it is made somewhat deeper than the inclined vertical peripheral storage channels (13) located around.

The melt level (8) formed in the central vertical storage channel (12) of the lower cassette (10) protects the base of the lower cassette (10) and the conical bottom of the casing (2) of the HRM (1) from impact from the core fragments and debris the bottom of the reactor vessel, the fall of which, with a different configuration of the central filler channel, could lead to damage to both the thermal protection of the conical bottom of the vessel (2) ULR (1) provided by ceramic elements (20) of the lower cassette (10), and the conical bottom itself.

The use of ceramic elements (20) instead of concrete in the base of the lower cassette (10) to protect the conical bottom of the housing (2) ULR (1) has the following advantages: the filler becomes homogeneous. In this case, the processes of interaction of the melt with filler elements occurring under different conditions are excluded: melt—ceramic elements on a cement binder and melt—monolithic concrete. In the latter case, the heating of the conical bottom of the body (2) of the HRM (1) cannot be synchronized with the heating of the cylindrical and toms parts of the body (2), while the risks of local thermal shock impact of the melt on the body (2) of the HRM (1) increase with the possible loss of strength due to for various thermomechanical loads of the casing (2): on the bottom side, heat transfer is blocked by concrete, and on the toms and cylindrical parts of the casing (2) ULR (1), the heating process is determined by the rate of interaction of ceramic elements (20) with the core melt, i.e., microporosity ceramic elements (20) and processes occurring in slotted channels (19). Considering that the thickness of the conical toms and cylindrical parts of the body (2) of the HRM (1) is different, the problem of leveling the temperature fields of the body (2) of the HRM (1) is crucial in the process of maintaining the body's strength and resistance to other types of influences.

The exclusion of concrete from the lower cassette (10) gives another positive effect a decrease in the yield of hydrogen and aerosols during the interaction of the core melt with concrete.

Thus, the use of a filler made in accordance with the claimed invention in the form of a monolithic structure having vertical central and peripheral channels, as well as horizontal channels formed by vertical central and peripheral storage channels and horizontal distribution channels in cassettes mounted on top of each other, made it possible to increase the reliability of the melt localization device by ensuring the distribution of energy of the fragments of the reactor vessel and the core melt between different types of channels in the filler, by providing reliable protection of the melt trap body from overheating in the initial period of the volley flow of the core melt from the reactor body into the melt trap body, which, in turn, allows minimizing the formation of hydrogen during the interaction of the melt with steam in the filler during the interaction of the melt with a binder.

SOURCES OF INFORMATION

1. RF patent No 35464, IPC G21C9/016, priority dated Aug. 18, 2013;
2. RF patent JV I b2514419, IPC G21C9/016, priority Jan. 6, 2012;
3. RF patent No 100327, IPC G21C9/016, priority dated Jun. 17, 2010 (prototype).

What is claimed is:

1. A melt localization device, comprising:
a double-walled cooled case, a bottom of the double-walled cooled case being recessed to a center of the bottom with a slope, and filled with filler;
a guiding element for organizing movement of a melt;
a passive system for supplying water to the surface of the melt,
wherein the filler comprises several upper cassettes and a lower cassette, each cassette of the upper cassettes and the lower cassette containing one vertical central storage channel and several vertical peripheral storage channels of equal diameters, wherein the diameter of the vertical central storage channel exceeds the equal diameters of the vertical peripheral storage channels,
wherein for each cassette of the upper cassettes and the lower cassette, the cassette further comprises horizontal radial distribution channels connecting the vertical peripheral storage channels of the cassette to the vertical central storage channel of the cassette, and wherein for each upper cassette of the upper cassettes, the upper cassette comprises horizontal azimuth distribution channels connecting the vertical peripheral storage channels of the upper cassette with each other,
wherein the horizontal radial distribution channels of the lower cassette are made with a slope, the angle of which coincides with the slope of the bottom of the melt trap body,
wherein the horizontal radial distribution channels and the horizontal azimuth distribution channels have equal diameters,
wherein the upper cassettes and the lower cassette contain ceramic plates having microchannels separated by horizontal slot channels and vertical slot channels, and the upper cassettes and the lower cassette are mounted on top of one another in such a way that contours of the vertical central storage channel of the upper cassettes and the lower cassette coincide with each other to provide a combined vertical central storage channel and contours of the vertical peripheral storage channels of the upper cassettes and the lower cassette coincide with each other to provide a plurality of combined vertical peripheral storage channels.

2. The melt localization device according to claim 1, characterized in that the vertical peripheral storage channels of the upper and lower cassettes are located on the same axial axis with a corresponding radial rib of the cooled case.

3. The melt localization device according to claim 1, characterized in that a depth of the combined vertical central storage channel formed by the upper cassettes and the lower cassette exceeds a depth of each of the plurality of combined vertical peripheral storage channels.

4. The melt localization device according to claim 1, characterized in that a damper is installed in the combined vertical central storage channel, and comprises a central shell, power ribs connected to the central shell, inclined plates located between the power ribs, and clamps that secure the damper to the cooled case.

* * * * *